United States Patent [19]

Hellriegel

[11] Patent Number: 4,702,040
[45] Date of Patent: Oct. 27, 1987

[54] DOOR FOR A MOTOR VEHICLE

[75] Inventor: Edmund Hellriegel, Pulheim, Fed. Rep. of Germany

[73] Assignee: Dynamit Nobel AG, Troidorf, Fed. Rep. of Germany

[21] Appl. No.: 873,358

[22] Filed: Jun. 12, 1986

[30] Foreign Application Priority Data

Jun. 12, 1985 [DE] Fed. Rep. of Germany ....... 3520975

[51] Int. Cl.4 ............................................... B60J 5/04
[52] U.S. Cl. .................................................... 49/502
[58] Field of Search .................. 49/502, 503; 296/146, 296/37.13

[56] References Cited

U.S. PATENT DOCUMENTS

| 3,258,877 | 7/1966 | Peras | 49/502 |
| 3,370,384 | 2/1968 | Hafer et al. | 49/502 |
| 3,387,409 | 6/1968 | Gorys et al. | 49/502 X |
| 3,782,036 | 1/1974 | Clark et al. | 49/502 |
| 3,791,693 | 2/1974 | Heuriegel et al. | 49/503 X |
| 3,907,358 | 9/1975 | Barenyi et al. | 296/146 |
| 3,964,208 | 6/1976 | Renner et al. | 49/502 |
| 4,328,642 | 5/1982 | Presto | 49/502 |
| 4,407,540 | 10/1983 | Korff | 296/146 |
| 4,432,167 | 2/1984 | Watanuki | 49/502 |

FOREIGN PATENT DOCUMENTS 888759 2/1962 United Kingdom ................. 49/502

Primary Examiner—Philip C. Kannan
Attorney, Agent, or Firm—Antonelli, Terry & Wands

[57] ABSTRACT

A motor vehicle door including a supportive and dimensionally stable skeleton which, together with an inner shell, constitutes a one-piece door body, to which an outer shell is attached as a separate element. The inner shell and the outer shell are fashioned from a synthetic resin and the supportive skeleton connects hinge members with the door lock of the door. The inner skin is provided with at least one of troughs or depressions and mounting bores or apertures.

24 Claims, 17 Drawing Figures

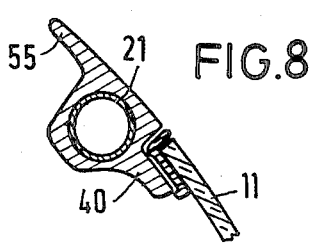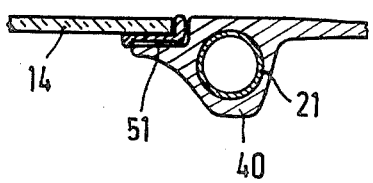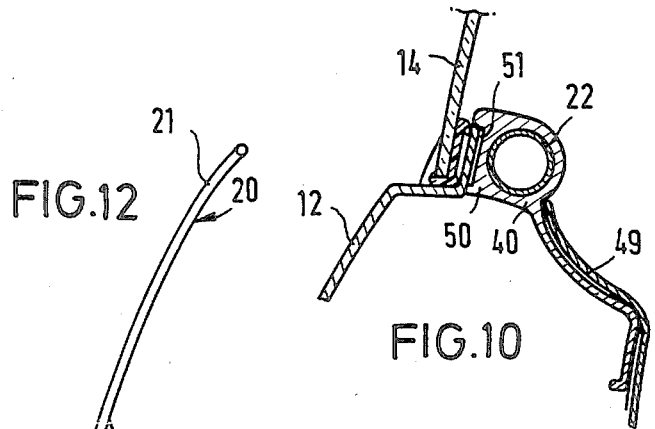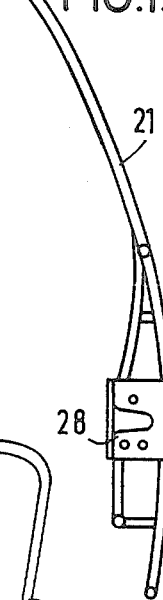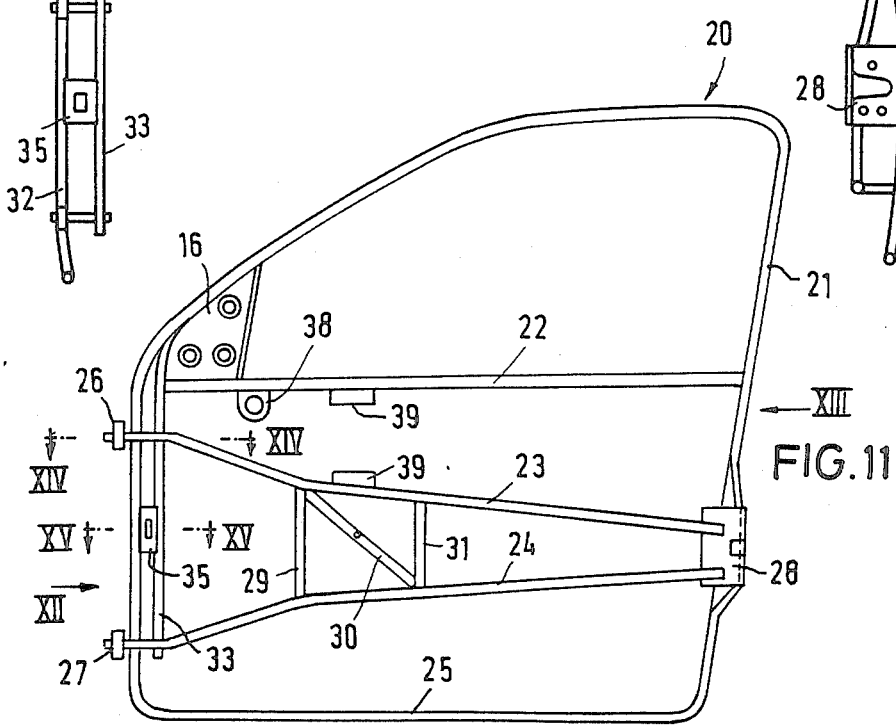

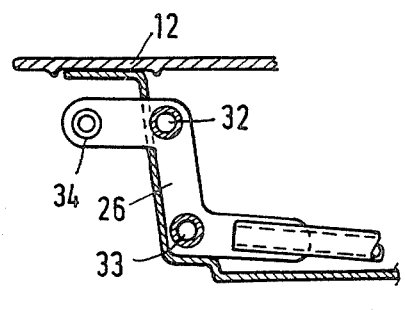 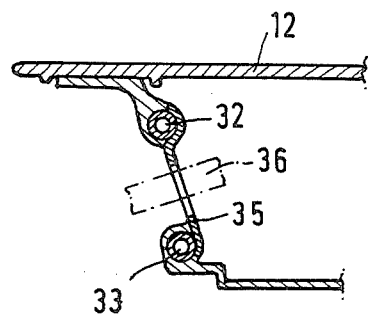
FIG.14  FIG.15
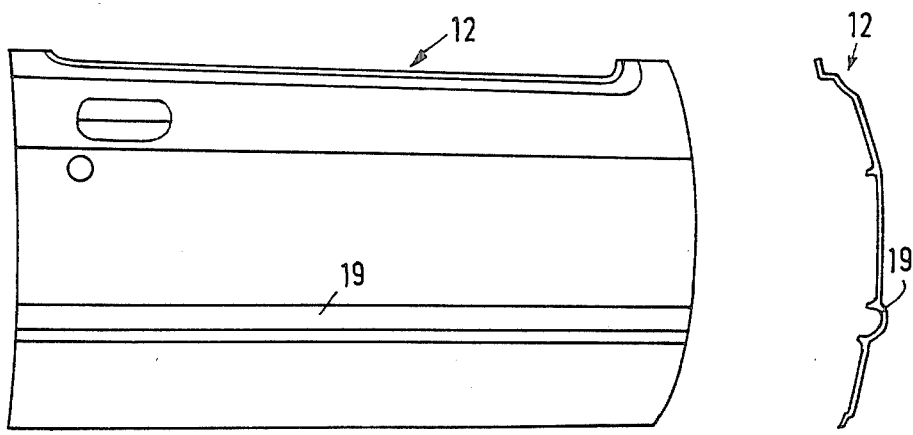
FIG.16  FIG.17

DOOR FOR A MOTOR VEHICLE

BACKGROUND OF THE INVENTION

The present invention relates to a door and, more particularly, to a door for a motor vehicle including an outer skin and an inner skin.

Conventional car doors generally include an outer skin made of metal which simultaneously provides a supportive and stabilizing function, with the outer skin being provided with rigidifying or reinforcing means in an interior of the door. The inner skin, which can be made of a synthetic resin, forms merely a paneling mounted to the outer skin but contributing little if anything to the ruggedness or sturdiness of the door. Thus, a disadvantage of the conventional motor vehicle door resides in the fact that the doors are not only heavy in weight but also relatively expensive to manufacture.

Synthetic-resin doors have also been proposed; however, these proposed synthetic-resin doors are unable to meet the desired functional requirements for a vehicle door and also unable to meet the legal requirements.

Moreover, the further disadvantages in the proposed synthetic-resin doors resides in the fact that the doors do not have dimensional stability, they shrink, and do not satisfy the demands posed by large-scale series manufacturing.

The aim underlying the present invention essentially resides in providing a vehicle door of the aforementioned type which, in spite of a very low weight, is dimensionally stable and can be manufactured in a simple and economical manner.

In accordance with advantageous features of the present invention, a motor vehicle door is provided wherein an outer skin and an inner skin of the door are fashioned of synthetic resin shells, with the inner skin being formed as an integral component of a door body including a supportive skeleton of rod-shaped bars.

By virtue of the features of the present invention, the inner skin of the vehicle door represents the supportive member rather than, as with conventional doors, the outer skin, and the supportive skeleton is integrated into the inner skin. The supportive skeleton includes rigid and dimensionally stable struts coated by, for example, molding, with the synthetic resin of the inner skin and the outer skin, shaped as separately produced shells, being attached to the inner skin. The outer skin has no supportive function so that, in the case of damage to the outer skin, the structure of the door will not be adversely affected. The surfaces of the inner and outer skins are elastic so that they regain their original shape if subjected to an impact or shock that is not excessive.

Since the vehicle door of the present invention consists almost exclusively of a synthetic resin, the door offers, in addition to the advantage of a low weight, a positive feature in as much as the door is not subject to change by rust or corrosion. Moreover, the struts of the supportive skeleton, which can be fashioned of metal, are entirely embedded in the material of the inner skin and surrounded by this material so that they are also effectively protected against adverse environmental influences.

In accordance with the present invention, hinge members are mounted at one end of the supportive skeleton, and a lock is arranged at the opposite end. With this arrangement or construction, the ridged and dimensionally stable supportive skeleton takes care of retaining the correct spacial correlation between the lock and the hinge members thereby insuring that, in the case of dimensional changes taking place at the synthetic resin parts, the door will always close in the correct manner, and the function of the lock is not impaired by any such dimensional changes.

Preferably, in accordance with the present invention, the outer skin terminates at the lower boundary line of a window, and the supportive skeleton, integral with the inner skin, is fashioned so that it extends completely around the window. The supportive skeleton constitutes not only the supportive and stabilizing part of the vehicle door, but also simultaneously a frame imbedded in the inner skin, insuring the door retains its shape. The outer skin is not attached directly to the supportive skeleton, but rather to the parts of the inner skin surrounding the supportive skeleton and, consequently, it is unnecessary to attach synthetic resin to metal which would require special mounting elements such as, for example, screws, clips, fasteners or the like, and it is possible to, for example, glue the outer skin to the inner skin.

In accordance with still further features of the present invention, the skeleton includes at least one essentially horizontally extending strut means extending over an entire length of the door, and the inner skin, above and/or below the strut, recedes to form an arm rest, a door pouch, or the like, or respectively, is provided with openings for enabling a formation of mounting boards. In this manner, it is possible to optimally utilize the inner space of the door and to greatly reduce idle volume or wasted space. Moreover, the interior of the motor vehicle is enlarged or increased to a considerable extent based on the external dimensions of the vehicle.

Advantageously, mounting faces for engaging the outer skin are provided at beads of the inner skin surrounding the struts of the supportive skeleton, whereby the outer skin forming a protective shell, can be joined in a simple manner with the inner skin and, consequently, with the supportive skeleton.

In order to seal a door gap, the inner skin and/or the outer skin maybe provided with sealing lips integrally molded along a circumference of the vehicle door, and, consequently, it is unnecessary to provide separate sealing lips of foreign materials since the sealing action is performed or accomplished by the material of the inner skin fashioned to be correspondingly thin at the sealing lips.

The above and other objects, features and advantages of the present invention will become more apparent from the following description when taken into connection with the accompanying drawings which show, for the purposes of illustration only, several embodiments in accordance with the present invention.

BRIEF DESCRIPTION OF THE DRAWINGS

FIG. 8 is a cross-sectional view taken along a line VIII—VIII of FIG. 2;

FIG. 9 is a cross-sectional view taken along a line IX—IX in FIG. 2;

FIG. 10 is a cross-sectional view taken along a line X—X in FIG. 2;

FIG. 11 is a schematic view of a supportive skeleton of a vehicle door constructed in accordance with the present invention;

FIG. 12 is an end view of the supportive skeleton taken in a direction of an arrow XII in FIG. 11;

FIG. 13 is an end view of the supportive skeleton taken in a direction of an arrow XIII in FIG. 11;

FIG. 14 is a cross-sectional view taken along a line XIV—XIV in FIG. 11, with an additional illustration of an outer skin;

FIG. 15 is a cross-sectional view taken along a line XV—XV of FIG. 11, with an additional illustration of the outer skin;

FIG. 16 is a side view of the outer skin for a vehicle door constructed in accordance with the present invention; and FIG. 17 is a profile view of the outer skin of FIG. 16.

DETAILED DESCRIPTION

Figure 1:
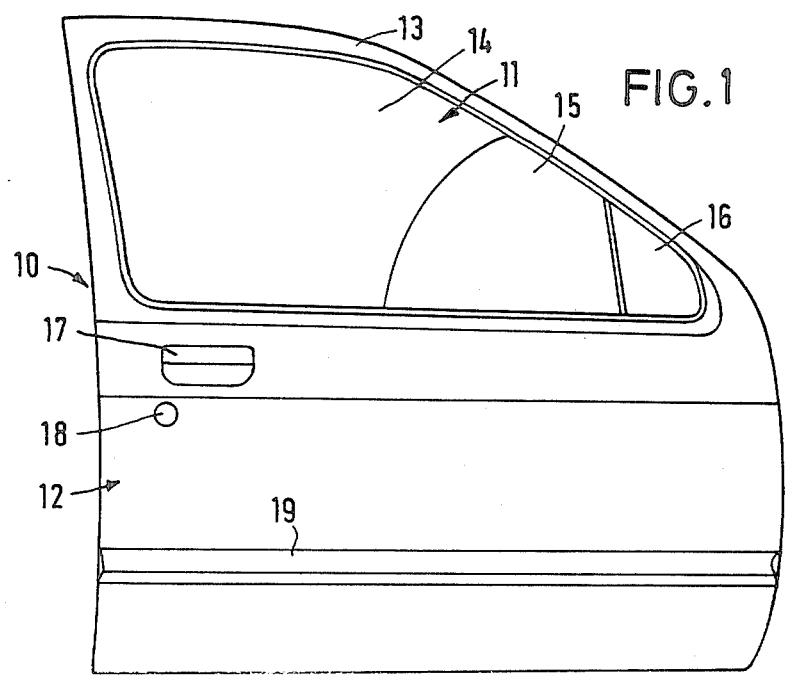
FIG. 1 is an exterior side view of a vehicle door constructed in accordance with the present invention.

Referring now to the drawings wherein like reference numerals are used throughout the various views to designate like parts and, more particularly, to FIG. 1, according to this figure, a vehicle door adapted to be mounted on a passenger motor vehicle, includes a supportive door body generally designated by the reference numeral 10 to which an outer skin generally designated by the reference numeral 12 is attached beneath a window opening generally designated by the reference numeral 11. Struts or frame members 13 define the window opening 11 toward the top and laterally are parts of the door body 10. The window opening 11 includes a window pane 14 fixably connected to the door body 10 and occupying or covering a largest part of the window opening 11, and a movable window part or pane 15 adapted to be selectively raised and lowered from and into an interior of the vehicle door in order to open at least a portion of the window opening. A forward corner of the fixed window pane 14, which converges pointedly, includes a mounting plate 16 to which a rear view mirror can be attached, with the mounting plate 16 being firmly joined to the door body 10. A door handle 17 and keyhole 18 of a lock are conventionally mounted at the outer skin 12, which is fashioned as a projecting shell. The outer skin 12 terminates approximately at a bottom edge of the window 14 and includes, in a lower zone or area thereof, a longitudinally extending impact protection molding 19 in the form of a hollow bead. As shown in FIGS. 16 and 17, the outer skin 12 is fashioned as a separately manufactured shell produced from a synthetic resin and subsequently fastened to the door body 10.

Figure 2:
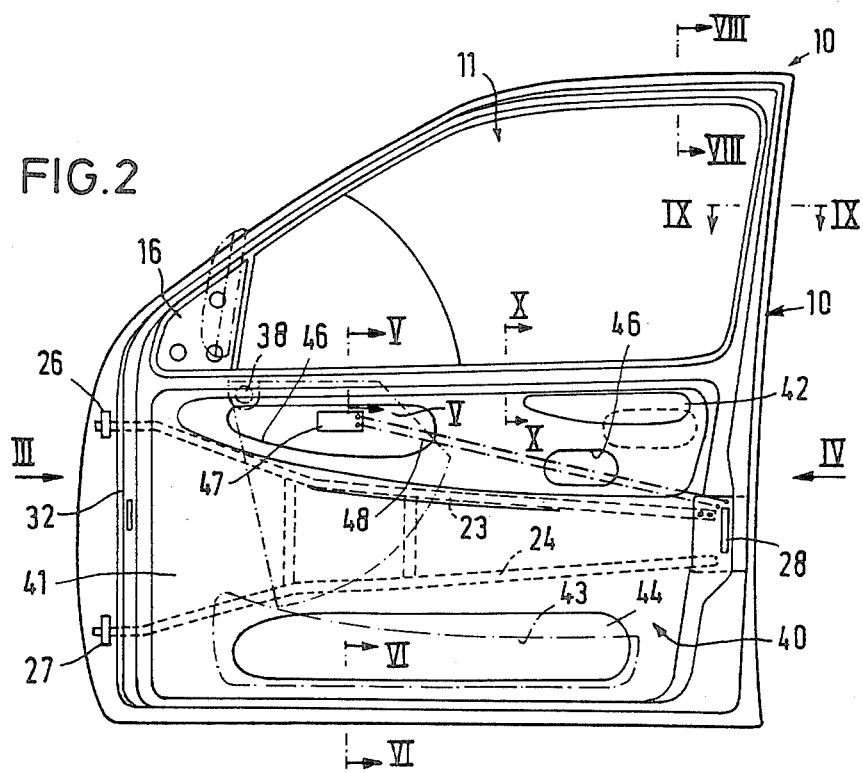
FIG. 2 is a schematic interior view of the vehicle door of FIG. 1.
Figure 3:
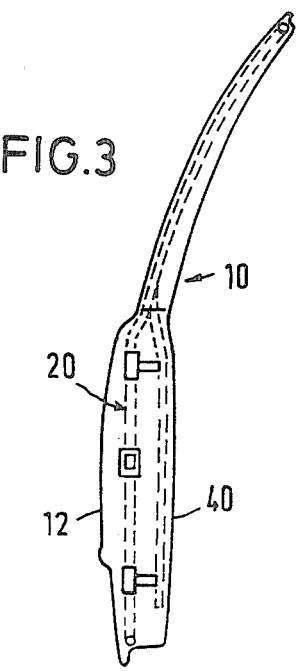
FIG. 3 is an end view taken in a direction of the arrow III in FIG. 2.
Figure 4:
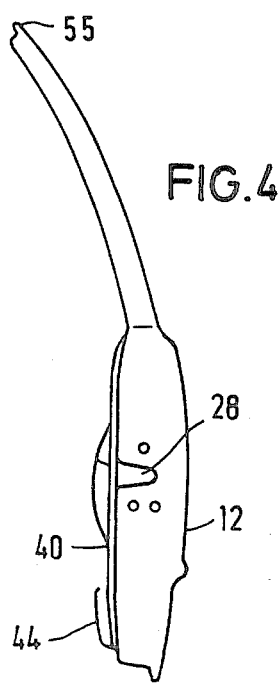
FIG. 4 is an end view taken in a direction of the arrow IV in FIG. 2.

As shown most clearly in FIG. 2, the door body 10 includes a supporting skeleton 20 which, as shown in FIG. 11, is fashioned of a plurality of rigid struts formed preferably of, for example, metal, with a cross-section of the rigid struts being, for example, tubular. The supportive skeleton 20 includes a closed frame 21, a contour of which corresponds to that of the vehicle door. In the closed frame 21, below the opening 11 for the window, a longitudinal strut 22 extends which runs along an entire length of the closed frame 21, and the ends of which are connected to vertical struts of the closed frame 21. Two additional longitudinal struts 23, 24, extend essentially or substantially horizontally in a region or area between the longitudinal strut 22 and the lower frame strut 25. Each of the longitudinal struts 23, 24, extends from one hinge member 26 or 27 at one end of the closed frame 21 to the lock 28 at the other end of the closed frame 21. The longitudinal struts 23, 24, are connected with each other by transverse struts 29, 30, 31, in order to form within the closed frame 21 a rigid carrier extending from the hinge members 26, 27, to the lock 28.

The hinge members 26, 27, are attached to two parallel vertical struts 32, 33, constituting the forward end of the closed frame 21. The strut 32 is located in the major plane of the frame 21, whereas the strut 33 is oriented away therefrom towards the interior of the vehicle. The hinge members 26, 27, each of which exhibits a forwardly projecting hinge arm 34 (FIG. 14) are attached to the struts 32, 33. A mounting bridge 35 extends in the center between the hinge members 26, 27, between the struts 32, 33, with the mounting bridge 35 having a passage opening for a holding tongue 36 projecting into the interior of the vehicle door and defining the open position of the door. Moreover, a bearing 38 is provided for the pivoting window 15 and mounting means 39 for a window operating device or crank mechanism (not shown) are attached to the closed frame 21.

The supportive skeleton 20, with the exception of the mounting plate 16, hinge members 26, 27 and lock 28, is entirely coated by molding by the synthetic resin of the inner skin 40 and embedded in the synthetic resin. As shown most clearly in FIGS. 5–10, all of the struts of the supportive skeleton 20 are entirely encompassed by the synthetic resin of inner skin 40. The inner skin 40 furthermore is fashioned as a shell 41 extending essentially over the entire area beneath a bottom edge of the window 14 (FIG. 2). A supporting trough or depression 42 for insertion or accommodation of the elbow rest is integrally molded within the shell 41, and, in a lower zone or area of the door body 10, a storage trough or depression 43 (FIGS. 2, 6) is molded in place. The troughs or depressions 42, 43, arranged above and below the beam formed by the longitudinal struts 23, 24, project from an interior of the vehicle toward the outside, that is, the troughs or depressions 42, 43, bulge or protrude in the direction toward the outer skin 12 and are in overlapping relationship, as seen from a top view, with the longitudinal struts 23, 24. A lateral cheek 44 is disposed in front of the storage trough 43 (FIG. 6), with the lateral cheek 44 projecting into the interior of the vehicle and defining the storage pouch formed in the storage trough 43. Furthermore, mounting bores or apertures 46 (FIG. 2) are provided in the inner skin 40. An operating mechanism 47 for the door lock 28, attached to the supportive skeleton 20, is arranged behind one of the mounting bores or apertures 46, with a linkage 48 extending from the operating mechanism 47 through the interior of the vehicle door 10 to the door lock 28. The inner skin 40 is partially covered with a door paneling 49 (FIG. 10) covering the mounting bores or apertures 46.

Figure 6:
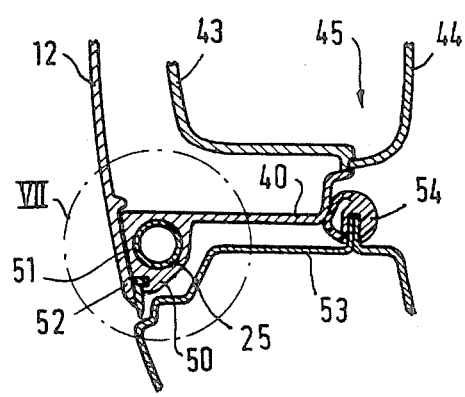
FIG. 6 is a cross-sectional view taken along a line VI—VI in FIG. 2.
Figure 7:
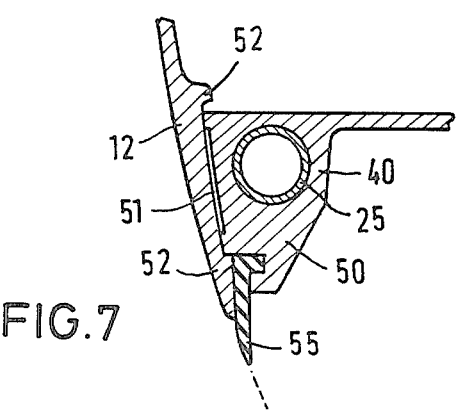
FIG. 7 is an enlarged view of a detail designated VII in FIG. 6.

The attachment of the outer skin 12 to the inner skin 40 is most clearly shown in FIGS. 6, 7. The struts of the supportive skeleton 20 include hollow profile members surrounded by beads 50 of the inner skin 40, and the beads 50 include an outwardly oriented contact face 51 which is brought into flat engagement with the outer skin 12. A shallow indentation for accommodating an adhesive media is provided in each contact face 51. On both sides of the contact face 51, the outer skin 12 is provided with webs 52 serving for positioning the outer skin 12 with respect to the inner skin 40 and for preventing an escape of the adhesive media.

As shown in FIG. 6, a sealing strip 54 is attached to a stepping sill 53 of the vehicle, with the sealing strip 54 being contacted by a step shoulder generally designated by the reference numeral 45 of the inner skin 40 when the vehicle door 10 is closed. Similar sealing strips 54 are provided at the remaining edges of the frame of the door 10. The outer skin 21 and/or the inner skin 40 additionally include integrally molded or separately attached sealing lips 55 which contact a boundary of a door opening of the vehicle side.

Figure 5:
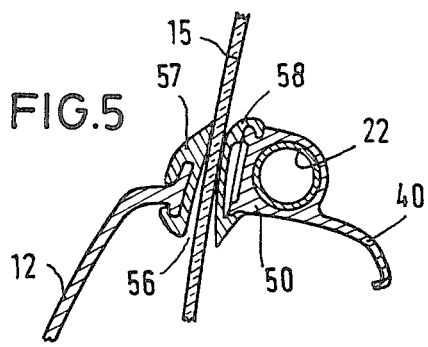
FIG. 5 is a cross-sectional view taken along a line V—V in FIG. 2.

As shown in FIG. 5, the movable or pivoting window part 15 is movable or pivotable about a bearing 38 and is adapted to be lowered through a window gap 56 into an interior of the vehicle door 10. For the sake of clarity, the conventional operating mechanism for moving the movable window part 15 which, for example, may be a mechanical construction or a cerval operated mechanism, are not illustrated in detail for the sake of clarity. The window gap 56 is defined on both sides of the pivotable window part 15 by sealing strips 57, 58, with the sealing strip 57 being mounted to a top edge of the outer skin 12, whereas, the opposite sealing strip 58 is attached to the head 50 of the longitudinal strut 22.

FIG. 10 provides an illustrated example of an attachment of the fixed pane 14, a lower edge of which, is secured by an adhesive media such as, for example, glue, to an outside of the upper end of the outer skin 12. The upper end of the upper skin 12, is, in turn, glued the mounting face 51 of the bead 50 of the longitudinal strut 22. On a rearward vertical strut 21, the fixed window pane 14, is, as shown in FIG. 9, additionally secured by, for example, an adhesive such as glue to a mounting face 51 with the interposition of a gasket or the like. As can readily be appreciated, the outer skin need not be necessarily be glued or cemented to the inner skin 40 but rather may be attached by faster means such as, for example, screws, clips, spot welding, or the like.

While I have shown and described several embodiments in accordance with the present invention, it is understood that the same is not limited thereto but is succeptable to numerous changes and modifications, and I therefore do not wish to be limited to the details shown and described herein, but intend to cover all such modifications as are encompassed by the scope of the appended claims.

I claim:

1. A door for a motor vehicle comprising an outer skin means an inner skin means, said outer skin means and said inner skin means being fashioned as synthetic resin shells, said inner skin means being formed as an integral component of a body of the door which includes a supportive skeleton means comprising a plurality of rod-shaped strut means, said supportive skeleton means including a closed frame of a contour which corresponds to that of the door, and wherein said rod-shaped strut means is entirely coated by molding of the synthetic resin of said inner skin means.

2. A door according to claim 1, further comprising a plurality of hinge means attached at one end of the supportive skeleton means, and a door lock means attached to an opposite end of the supportive skeleton means.

3. A door according to claim 2, wherein the outer skin means terminates at a lower boundary line of a window of the door, and said skeleton means is integral with the inner skin means and fashioned to extend entirely around the window of the door.

4. A door according to claim 3, wherein said plurality of said rod-shaped strut means includes at least one substantially horizontal strut means extending substantially over an entire length of the door, and said inner skin means recedes at least one of above and below the substantially horizontal strut means for forming at least one of an armrest, a door pouch, or openings for enabling a formation of mounting bores.

5. A door according to claim 4, further comprising mounting face means for contacting the outer skin means provided on bead means formed on the inner skin means, said bead means encompassing at least portions of the strut means of the supportive skeleton means.

6. A door according to claim 5, wherein at least one of the inner skin means and the outer skin means includes sealing lip means integrally molded along a circumference of the door.

7. A door according to claim 6, wherein the window includes a fixed window pane joined to the inner skin means.

8. A door according to claim 7, wherein the outer skin means includes an outwardly projecting impact projection molding means formed integrally therewith.

9. A door according to claim 8, wherein the rod-shaped strut means of the supportive skeleton means are formed of metal.

10. A door according to claim 2, wherein the closed frame means extends all around an edge of the door, said plurality of strut means includes at least two central longitudinal strut means respectively extending from one of the hinge means to the door lock means joined together by reinforcing strut means, and wherein a further longitudinal strut means forms a lower boundary of a window of the door of the motor vehicle.

11. A door according to claim 1, wherein the outer skin means terminates at a lower boundary line of a window of the door, and said supportive skeleton means is integral with the inner skin means and fashioned to extend entirely around the window of the door.

12. A door according to claim 11, further comprising mounting face means for contacting the outer skin means provided on bead means formed on the inner skin means, said bead means encompassing at least portions of the strut means of the supportive skeleton means.

13. A door according to claim 12, wherein at least one of the inner skin means and the outer skin means includes sealing lip means integrally molded along a circumference of the door.

14. A door according to claim 13, wherein the window includes a fixed window pane joined to the inner skin means.

15. A door according to claim 14, wherein the outer skin means includes an outwardly projecting impact projection molding means formed integrally therewith.

16. A door according to claim 15, wherein the rod-shaped strut means of the supportive skeleton means are formed of metal.

17. A door according to claim 1, wherein said plurality of said rod-shaped strut means includes at least one substantially horizontal strut means extending substantially over an entire length of the door, and said inner skin means recedes at least one of above and below the substantially horizontal strut means for forming at least one of an armrest, a door pouch, or openings for enabling a formation of mounting bores.

18. A door according to claim 1, further comprising mounting face means for contacting the outer skin means provided on bead means formed on the inner skin means, said bead means encompassing at least portions of the strut means of the supportive skeleton means.

19. A door according to claim 1, wherein at least some of the plurality of strut means of the supportive skeleton means extend along an entire circumference of the door.

20. A door according to claim 1, wherein at least one of the inner skin means and the outer skin means includes sealing lip means integrally molded along a circumference of the door.

21. A door according to claim 1, wherein a window of the door includes a fixed window pane joined to the inner skin means.

22. A door according to claim 1, wherein the outer skin means includes an outwardly projecting impact projection molding means formed integrally therewith.

23. A door according to claim 1, wherein the rod-shaped strut means of the supportive skeleton means are formed of metal.

24. A door according to claim 1, wherein the a closed frame extends all around an edge of the door, and wherein the plurality of strut means includes at least two central longitudinal strut means respectively extending from one of a plurality of hinge means to a door lock means, said at least two central longitudinal strut means being joined together by reinforcing strut means, and wherein a further longitudinal strut means forms a lower boundary of a window of the door.

* * * * *